United States Patent
Palme et al.

[15] 3,682,279
[45] Aug. 8, 1972

[54] BRAKE ACTUATING MECHANISM FOR RAPID TAKE UP OF RUNNING CLEARANCE AND GRADUAL APPLICATION OF BRAKE SETTING FORCE

[72] Inventors: Karl Palme, Milwaukee; Raymond L. Watts, Mukwonago, both of Wis.

[73] Assignee: Wehr Corporation, Milwaukee, Wis.

[22] Filed: March 9, 1970

[21] Appl. No.: 17,603

[52] U.S. Cl. ............... 188/171, 188/71.9, 188/72.3
[51] Int. Cl. .......................... B60t 13/74, F16d 55/39
[58] Field of Search ........... 188/71.9, 72.3, 72.9, 170, 188/171

[56] References Cited

UNITED STATES PATENTS

| | | |
|---|---|---|
| 2,974,756 | 3/1961 | Roehm ...................... 188/171 |
| 3,139,160 | 6/1964 | Hink et al. ................. 188/171 |
| 3,289,797 | 12/1966 | Brzezinski et al. ........ 188/171 |

*Primary Examiner*—Duane A. Reger
*Attorney*—John W. Michael, Gerrit D. Foster, Bayard H. Michael, Paul R. Puerner, Joseph A. Gemignani, Andrew O. Riteris, Daniel Van Dyke and Spencer B. Michael

[57] ABSTRACT

A plurality of stationary metallic discs are alternately arranged with and selectively moved into and out of braking engagement with a plurality of rotating friction discs. A rotatable member carrying an adjustable pin is movable axially to move the pin into engagement with a pressure arm which acts on the stationary discs to set the brake by interengagement of the stationary and rotating discs. The rotatable member includes a cam surface which engages a fixed cam guide such that, as the rotatable member is rotated, the member and pin move jointly in an axial direction with respect to the discs. The cam surface includes a first rise portion for rapid and relatively greater axial travel during initial brake movement to take up the release or running clearance. The cam also includes a relatively shallow rise portion to provide a gradual application of a relatively high brake setting force with reduced axial travel after the release clearance has been taken up. A ratchet and pawl arrangement provides for axial adjustment of the pin with respect to the disc to compensate for disc wear. The brake actuator is of the spring set and electromagnetically released type and includes a manual release. A damper is included in the actuator and is adjustable to provide for adjustment of the brake setting time independent of setting torque. The damper also prevents overriding of the cam guide and surface as the brake is set.

12 Claims, 3 Drawing Figures

PATENTED AUG 8 1972
3,682,279
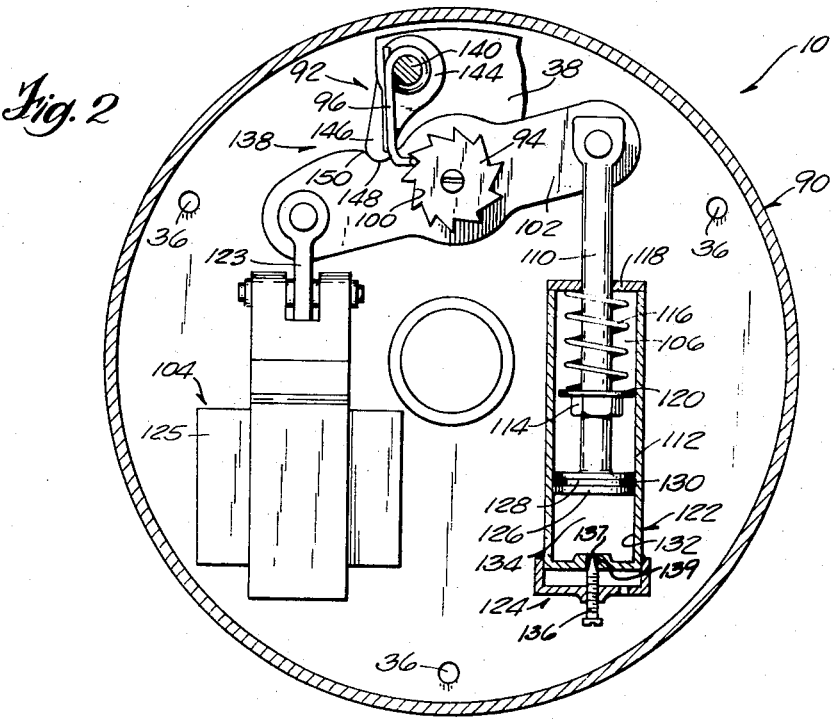
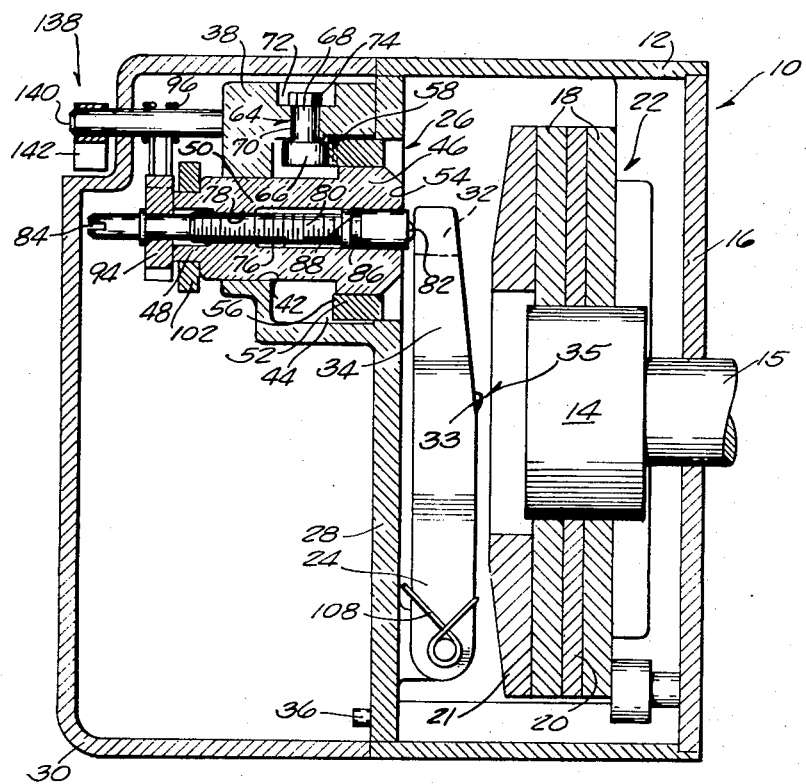
Inventors
Karl Palme
Raymond L. Watts
By Joseph A. Genovese
Attorney

BRAKE ACTUATING MECHANISM FOR RAPID TAKE UP OF RUNNING CLEARANCE AND GRADUAL APPLICATION OF BRAKE SETTING FORCE

This invention relates to devices for controlling rotary motion and, more particularly, to a brake of the spring set electromagnetic release-type and to an improved actuating mechanism for setting and releasing the brake.

Disc-type brakes of the type to which this invention relates have encountered general acceptance due to their compactness, economy of construction and reliability. Present proposals, however, generally fail to make efficient use of the spring force during the brake setting cycle. This can result in requiring relatively large solenoids, where such are used in the brake actuator, or in reducing the amount of available braking torque.

Furthermore, in present brakes the brake setting time is generally related to torque. Thus, brakes designed to provide high torque generally also exhibit relatively fast, generally fixed setting times.

Among the general objects of this invention are to provide an improved brake setting and release mechanism which makes more efficient use of spring force, and one which provides for adjustment of setting time independent of torque.

The brake apparatus proposed by this invention comprises a plurality of rotary discs operatively connected to a motor or other rotary device. A plurality of stationary discs are alternately arranged with the rotating discs and provision is made for relative movement between the stationary and the rotary discs to set the brake.

An actuating means is provided for selectively setting and releasing the brake and is comprised of a rotatable member supported on a mounting plate and has a cam surface and a cam guide which cooperate on the basis of movement of the rotatable member to achieve brake setting action. A varying cam surface is provided and preferably includes at least two portions, a relatively fast rise portion and a relatively shallow rise portion. As the rotatable member rotates, relative movement between the cam guide and the cam surface occurs to produce that movement and force which is necessary for setting the brake. The fast rise cam portion provides rapid and a relatively large amount of travel during the initial portion of the brake setting cycle to rapidly and effectively take up release clearance and engage the stationary and rotary discs. The shallow cam portion provides a small amount of movement with a gradual but relatively high brake setting force after the release clearance has been taken up. This cam arrangement achieves a more efficient use of the spring force.

The actuating means also preferably includes a solenoid and spring operatively linked to the combination of cam guide and cam surfaces with the solenoid releasing the brake while the spring sets it. The spring is provided with a damper. The damper is adjustable so that the brake setting time is adjustable independently of the brake torque and a high torque can be provided but the setting time can be selected as desired. The damper also prevents overriding of the cam guide and cam surfaces as the brake is set.

A ratchet and pawl arrangement is preferably provided to compensate for disc wear thereby maintaining the displacement of the actuating means required to set and release the brake relatively constant.

A manual release may also be provided which will release the brake without energizing the solenoid.

Thus, by providing brake setting action through a varying or non-linear cam surface, the displacement to achieve brake setting can be varied such that a rapid advance of the actuating mechanism is provided during the initial phase of the spring travel of the brake setting cycle wherein a relatively greater amount of brake movement occurs, i.e. in taking up running clearance. Subsequently, a gradual displacement but with a relatively high wedge force is provided.

FIG. 1 is a side elevation view taken in cross section of the brake proposed by this invention;

FIG. 2 is an end view of the brake with the end plate removed; and

FIG. 3 is an enlarged view of the cam surfaces and cam roller proposed by this invention.

Referring now to the drawings in detail, brake 10 includes frame 12 in which hub 14 is suitably journaled, the hub being connected to a shaft 15 of, for example, an electric motor (not shown). The brake is preferably connected to the motor through a front plate 16 which may be bolted to the motor. Friction discs 18 are splined on hub 14 for rotation with and axial movement on the hub. The friction discs are alternately arranged with stationary discs 20 which are suitably connected to frame 12 to be held against rotation with hub 14, only one of the stationary discs is illustrated. The stationary and rotating discs provide a brake disc assembly 22, this assembly being illustrated schematically, and provide the brake members which are selectively set to brake the motor and released to free the motor for rotation.

An actuating assembly 26 is provided for moving the stationary and rotating discs into braking engagement. Assembly 26 is mounted on a mounting plate 28 connected to frame 12 in a manner to be described more completely hereinafter. An end plate 30 completes the outer housing of brake 10 and is preferably removable to provide easy access to actuating assembly 26.

Actuating assembly 26 includes a pressure arm 24 which is mounted immediately adjacent brake assembly 22 for movement of the arm into and out of engagement with pressure plate 21 which is also part of assembly 22. Preferably, the arm is generally U-shaped having a web portion 32 and two legs 34. The free ends of the legs are pivotally connected to frame 12 or, as shown in FIG. 1, arm 24 is mounted on mounting plate 28. Legs 34 are provided with contact tabs 33 for engaging pressure plate 21 through which the setting force is applied to stationary discs 20 and rotating discs 18.

Mounting plate 28 is suitably connected to frame 12 by a plurality of screws 36. The mounting plate includes cylindrical housing means 38 for receipt of cam body 46. Cam body 46 comprises a neck portion 48, a shaft portion 50 and a flange portion 52. Housing means 38 has a stepped cross section with two axially adjacent chambers 42 and 44. Cam body 46 fits within housing means 38 with shaft portion 50 having a close fit within chamber 42 and flange portion 52 fitting loosely within chamber 44 to permit axial and rotational movement of cam body 46 within housing 38.

The axial length of chamber 44 is substantially greater than the axial width of flange 52 to allow cam guide 64 to extend into chamber 44 for engagement with flange 52 in a manner to be described more completely hereinafter. Neck portion 48 of cam body 46 extends out of housing means 38 away from disc assembly 22. Flange 52 comprises two faces 54 and 56; face 54 facing opposite face 56, the latter facing towards disc assembly 22. Face 56 includes a rising cam surface 58 provided with a relatively rapid rise portion 60 and an adjacent shallow rise portion 62 (see FIG. 3).

Cam guide member 64 is provided to engage cam surface 58 such that as cam body 46 is rotated in a clockwise direction, cam guide 64 engages cam surface 58 and axially shifts cam body 46 towards pressure arm 24 and disc assembly 22. Cam guide member 64 includes a roller 66 mounted in a bearing on a threaded shaft 68 suitably anchored on housing 38 in an aperture 70. Aperture 70 has a stepped cross section, the wider portion 72 receiving fastening nut 74 for securing cam guide member 64 to housing 38.

Cam body 46 is generally cylindrical having a hollow center 76, a portion 78 of which is tapped to provide for the threaded engagement of an operating pin 80 in cam body 46. Operating pin 80 is mounted in cam body 46 for joint axial and rotational movement with cam body 46 relative to mounting plate 28. In addition, pin 80, with its threaded engagement in cam body 46 is adapted for axial adjustment of pin 80 relative to cam 46. Pin 80 is preferably longer than cam body 46 having a head 82 facing pressure arm 24 and extending out from face 54 of flange 52. The opposite end of pin 80 from head 82 extends away from housing 38 and includes a notch 84 to permit easy manual adjustment of pin 80 relative to cam body 46 by use of a screwdriver or other suitable means.

Head 82 of pin 80 is in contact with web portion 32 of pressure arm 24 and as cam body 46 and pin 80 move axially toward disc assembly 22 to set the brake, pressure arm 24 and, more specifically, contact tabs 33 move axially toward disc assembly 22 to set the brake.

It will be appreciated that as pin 80 moves axially and rotationally with cam body 46, pin 80 bears on pressure arm 24 while rotating and thus has a tendency to rotate relative to cam body 46. This rotation of pin 80 is undesirable except for wear adjustment purposes (which will be explained hereinafter). To prevent this undesired rotation of pin 80 relative to cam body 46 during normal operation, annular O-ring groove 86 is provided in pin 80 permitting use of an O-ring 88 which engages the wall of hollow center 76. The friction between O-ring 88, or other suitable friction devices, and the wall prevents sliding rotation between pin 80 and cam body 46 unless wear adjustment is desired.

It was recognized that there are two phases of axial movement during the setting of brake 10. First is a take-up or closing phase during which the release clearance between the discs, and between the discs and pressure plate, is taken up and the stationary and rotating discs are engaged and application of a braking force is initiated. For example, this release clearance may be in the neighborhood of .050 inches. The second phase is that during which movement of the pressure arm urges the stationary discs into engagement with the necessary braking force to set the brake. Brake 10 is set and released by a force generating means 90 including a spring and solenoid combination. In order to make as efficient use as possible of the force generating means, a varying surface is provided for cam surface 58. Specifically, cam surface 58 is provided with two distinct portions 60 and 62. Portion 60 has a relatively steep inclination, with reference to the axis of cam body 46, to provide a relatively fast rise portion which will result in relatively rapid and greater amount of axial advancement of cam body 46 for a given amount of relative rotation of the cam surfaces and cam guide. That is, a relatively large amount of axial movement of cam body 46 occurs for a relatively small amount of rotational movement of the cam body. The steepness of cam portion 60 is selected to provide the necessary movement of pressure arm 24 into engagement with disc assembly 22, gap 35 in FIG. 1 has been exaggerated for better illustration, to start applying the braking force as cam roller 66 reaches the second portion 62 of cam surface 58. The second cam portion 62 is a relatively gradual sloped surface providing a relatively high force applied in a gradual manner and with less axial movement. Accordingly and with reference to the illustrated spring set electromagnetically released actuator, the available spring force is utilized most efficiently both in taking up the running clearance (the closing phase of the brake action) and in applying the actual braking force (the setting phase of the brake action). In the closing phase a greater amount of axial movement is provided with low force but rapidly. In the setting phase less axial movement occurs but with a higher and gradual force application. Thus an efficient and generally optimum use of the setting actuation is provided.

The brake is alternately set and released by force generating mechanism 90 comprising a rocker arm 102 operatively linked to solenoid 104 and an operator spring means 106. Rocker arm 102 is preferably fixed to the neck portion 48 of cam body 46 such that rotation of arm 102 provides a like rotation of cam body 46. Brake 10 is set by rotating rocker arm 102 clockwise (in FIG. 2) which, due to the interaction of cam surface 58 and roller 66, advances cam body 46, operating pin 80 and pressure arm 24 towards disc assembly 22. Upon contact between tabs 33 and the disc assembly, further advancement sets the brake. For release of brake 10, rocker arm 102 is rotated counterclockwise moving cam surfaces 60 and 62 out from under cam guide 64. Suitable biasing means such as spring 108 biases pressure arm 24, pin 80 and cam body 46 away from brake disc assembly 22 to retract the cam body into housing means 38 when the brake is released.

The brake setting force is provided by operator spring means 106 effective to rotate rocker arm 102 clockwise. While various suitable arrangements are available it is preferred to have a plunger 110 pivotally linked at one end to rocker arm 102 with the opposite end extending into housing 112, the latter being mounted on mounting plate 28. A nut 114 is threaded onto plunger 110 with a compression spring 116 compressed between wall 118 of housing 112 and a washer 120 is provided to accommodate the spring 116. The brake 10 is set by spring 116 which biases rocker arm 102 in a clockwise direction. A solenoid 104 is provided for releasing brake 10 by acting against the spring to release the braking force exerted on disc assembly 22. Solenoid 104 is mounted on mounting plate 28 and includes an armature 123 pivotally linked to the end of rocker arm 102 opposite the connection to spring 116 relative to the pivot axis of the rocker arm and cam body. Thus as the solenoid is energized, armature 123 will contract within solenoid body 125 thereby rotating rocker arm 102 counterclockwise overcoming the bias of spring 116 and brake 10 is released. Subsequent de-energization of solenoid 104 will release the spring force to set the brake.

As the brake is subjected to continual use, wear will develop thereby requiring a greater distance of travel by cam body 46, pin 80 and pressure arm 24 in setting the brake. To compensate for this, a self-adjust assembly 92 is provided comprising a ratchet 94 mounted on the end of pin 80 opposite the pressure arm engaging end of the pin. A pawl 96 is provided for engagement with ratchet 94. Pawl 96 is stationary and preferably mounted on shaft 140 fixed in the brake assembly. As cam body 46 and pin 80 rotate, ratchet 94 rotates in unison therewith. Ratchet 94 includes a plurality of teeth 98 and the length of the teeth 98 is selected so that during normal operation pawl 96 will move on surface 100 of one tooth 98 without engaging another tooth; however, as wear occurs between the discs the distance the pawl moves along the tooth surface will increase until wear exceeds a predetermined limit whereupon the pawl will engage a subsequent ratchet tooth. With the pawl and ratchet so engaged, counterclockwise movement of cam body 46 releasing the brake produces relative movement between the pin 80 and cam body 46 since the ratchet, which is held by pawl 96, is fixed to the operating pin. Thus relative rotation occurs between pin 80 and cam body 46 and pin 80 effectively remains stationary relative to the disc as cam body 46 retracts into housing means 38. This results in a greater extension of the pin beyond the cam body. This decreases the amount of travel of pin 80 and arm 24 necessary to set the brake on a subsequent operation and correspondingly, decreases the amount of extension of the operator spring so that the operator spring continues to operate within the range desired to exert a predetermined force. A small tension spring (not shown) biases pawl 96 into engagement with ratchet 94. O-ring 88, through friction engagement with the inner surface of hollow center 76 will not prevent this rotation of pin 80 to achieve wear adjustment.

As the brake is set, the momentum of moving parts, for example rocker arm 102, plunger 110, etc. may cause the cam surfaces 58 to ride too far under cam guide 64. In other words, it may go beyond the point necessary for braking action and generate a force in excess of that required for normal braking. Any vibration, which is common, will cause the cam body to back up to a pressure point where the brake is still set but, in so doing, reduces the predictability of brake characteristics. To alleviate this problem, it is proposed to make spring housing 112 operate in the nature of a dash-pot. Accordingly, a chamber 122 is provided with a valve 124 permitting restricted air release upon movement of plunger 110 by spring 116 while permitting virtually unrestricted ingress of air to the chamber. Plunger 110 includes a piston 126 with an O-ring groove 128. By providing O-ring 130 in groove 128, a seal is created between piston flange 126 and inner wall 132 of chamber 122 and more specifically that portion 134 between flange 126 and valve 124. Restricting air release damps movement of spring 116 producing a smooth, uniform application of the setting force and preventing override of cam surfaces 58 under cam guide 64. Needle valve 124 is provided with an adjustable screw 136 permitting airflow adjustment and correspondingly adjustment of the brake setting characteristics.

More particularly, it was discovered that the use of the adjustable damper permits the setting time of the brake to be varied independently of brake torque. Generally, brakes which have been designed to provide, for example, high torque also exhibited fast setting times because setting time and torque were inherently related. With the illustrated adjustable damper arrangement, the setting time can be selected virtually independently of the torque provided. This is accomplished simply and effectively by adjusting screw 136 to vary the position of needle point 137 in orifice 139 and thereby vary the rate of air release from the damper.

Release means 138 is provided for manually releasing the brake when desired and includes shaft 140 carrying release handle 142. Shaft 140 is suitably anchored in housing means 38 of mounting plate 28 and projects through a suitable aperture in end plate 30. Release handle 142 is external from end plate 30 thereby permitting manipulation of release means 138 without removal of end plate 30. Release lever 144 is mounted on shaft 140 for joint rotation with it and handle 142. Lever 144 includes a finger portion 146 for operative engagement with rocker arm 102 in a recessed portion 148. A lip portion 150 of recess 148 acts as a cam surface and finger 146 acts as a cam guide. Thus, if the brake is set and it is desired to manually release it, handle 142 (and therefore shaft 140 and lever 144) is rotated counterclockwise, finger 146 moves over lip 150 into recess 148 which moves rocker arm 102 in a counterclockwise direction thereby releasing the brake. Recess 148 and finger 146 cooperate to hold the brake released. Means 138 can be disengaged simply by reversing the rotation of shaft 140 and lever 144. Or in the alternative, manual release can be selected such that armature 123 is not fully moved into coil 125 so that, with lever 144 biased in a counterclockwise direction, subsequent energizing of solenoid 104 draws armature 123 into solenoid body 125 and rotates arm 102 slightly to release lever 144.

Although but a single embodiment of the present invention has been illustrated and described, it will be apparent to those skilled in the art that various changes and modifications may be made therein without departing from the spirit of the invention.

We claim

1. Rotary motion control apparatus comprising, in combination, a plurality of rotatable discs, a plurality of stationary discs alternately arranged with said rotatable discs and supported for selective movement into and out of engagement with said rotatable discs to alternately clamp said discs against and release said discs for relative rotational movement, operating means operatively associated with said discs and through which the force for moving said discs into engagement is transmitted, said operating means comprising, a first and second member, one of said members including a cam surface having a varying cam rise, the other of said members having cam engaging means whereby relative movement of said members provides non-linear advancement of one of said members in a brake setting direction to provide the force for clamping said discs, and force generating means operatively associated with said members for producing relative movement therebetween.

2. The combination according to claim 1 wherein said operating means further includes a mounting plate having generally cylindrical housing means, said first member comprises a generally cylindrical shaft mounted for axial and rotatable movement in said housing means and having a flange portion including said cam surface, said second member mounted in said housing means and including a cam guide for engaging said cam surface whereby, as said first member is rotated, said engagement between said cam guide and cam surface provides axial movement of said first member in said brake setting direction to produce said clamping force.

3. The combination according to claim 2 wherein said cam guide comprises a cam roller rotatably mounted in said housing means.

4. The combination according to claim 2 wherein said varying cam surface comprises a first and second portion, said first portion having a fast rising surface, said second portion having a relatively shallow rising surface, said first portion providing relatively rapid and greater axial movement of said first member in response to relative movement of said first and second members, said second portion providing a relatively gradual and less axial movement of said first member with a relatively high force between said operating means and discs in response to further rotation of said first member.

5. The combination according to claim 4 wherein said operating means includes, an operating pin rotatably mounted in said first member, said pin arranged for axial movement jointly and relative to said first member, said pin having a head extending from said first member toward said discs and operatively associated with said discs to apply the clamping force between said stationary discs and said rotating discs, and wear adjustment means for automatically adjusting said operating pin axially relative to said first member when said first member axial movement in clamping and releasing said discs exceeds a preselected amount.

6. The combination according to claim 5 wherein said wear adjustment means comprises a ratchet and pawl, said ratchet mounted on said operating pin for joint rotation therewith and including a plurality of teeth and tooth surfaces, said pawl mounted in fixed relationship to said ratchet for engagement with said teeth and tooth surfaces such that, when said ratchet rotates a preselected amount, said pawl will engage a subsequent tooth providing for axial adjustment of said pin relative to said first member as said clamping force is released.

7. The combination according to claim 6 wherein said operating pin includes an O-ring groove in said first member, an O-ring mounted in said groove for friction engagement with said first member such that said operating pin is prevented from rotation relative to said first member except when said wear adjustment means operates.

8. The combination according to claim 1 wherein said force generating means comprises, electromagnetic means connected to and operative when energized to rotate one of said members to move said operating means to release the clamping force on said discs, and spring means connected to said one member and operative when said electromagnetic means is de-energized to rotate said one member to move said operating means to apply said clamping force to said discs.

9. The combination according to claim 8 including damping means associated with said spring means and acting against the application of said clamping force.

10. The combination according to claim 9 wherein said damping means is adjustable to vary the action thereof against said spring means so that the setting time of said brake can be varied.

11. The combination according to claim 1 wherein said operating means includes a member movable into and out of engagement with said discs to selectively apply a clamping force thereto and release said discs for relative movement therebetween, and said cam surface operatively connected to said movable member for producing the movement thereof to apply said clamping force, said cam surface having a first relative fast rise portion operative during initial operation of said operating means in taking up release clearance prior to applying said braking force and said cam surface further having a second relatively shallow rising surface operative after said fast rise portion to apply said clamping force in a gradual manner.

12. Rotary motion control apparatus comprising, in combination, a plurality of rotatable discs, a plurality of stationary discs alternately arranged with said rotatable discs and supported for selective movement into and out of engagement with said rotatable discs to alternately clamp said discs against and release said discs for relative rotational movement, operating means operatively associated with said discs and through which the force for moving said discs into engagement is transmitted, said operating means comprising, first and second members and means connected between said first and second members operative in response to relative movement between said first and second members to produce relatively fast movement of one of said members in a brake setting direction during the initial operation of said operating means to apply said braking force so that release clearance is taken up with minimum travel of said operating means and further operative after said initial operation to apply said clamping force in a gradual manner so that said one member advances in a non-linear manner in a brake setting direction to provide the force for clamping said discs, and force generating means operatively associated with said members for producing relative movement there-between.

* * * * *